J. O. COPE.

STEAM-RADIATOR.

No. 7,139. Reissued May 30, 1876.

Witnesses:

P. C. Dieterich

F. H. Duffy

Inventor:

John O. Cope

Per: C. H. Watson & Co. Attorneys.

UNITED STATES PATENT OFFICE.

JOHN O. COPE, OF PHILADELPHIA, PENNSYLVANIA.

IMPROVEMENT IN STEAM-RADIATORS.

Specification forming part of Letters Patent No. 175,241, dated March 28, 1876; reissue No. 7,139, dated May 30, 1876; application filed May 2, 1876.

*To all whom it may concern:*

Be it known that I, JOHN O. COPE, of the city of Philadelphia, in the county of Philadelphia and State of Pennsylvania, have invented certain new and useful Improvements in Steam-Radiators; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to that class of steam-radiators where the radiator is placed in the cellar or lower part of the building, and the heated air carried through pipes or flues through the building; and the nature of my invention consists in the construction and general arrangement of parts, as will be hereinafter more fully set forth.

Figure 1:
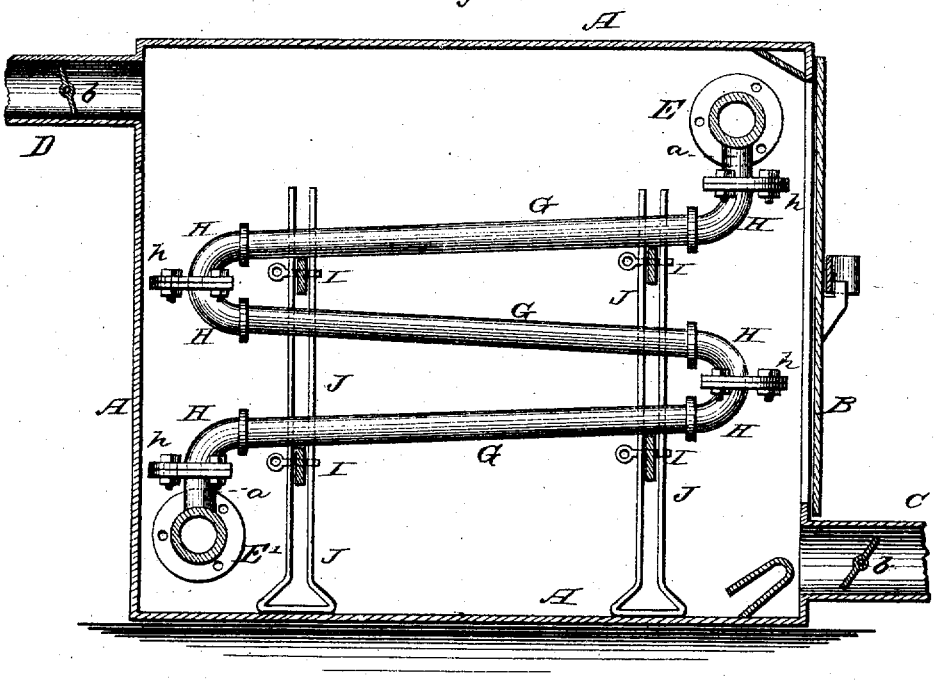
Figure 2:
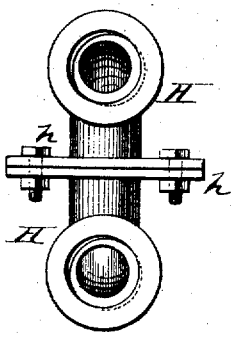
Figure 3:
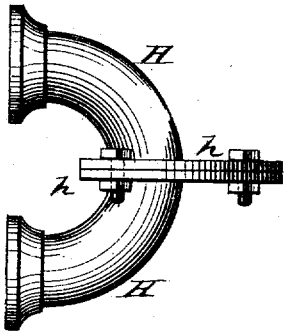
Figure 4:
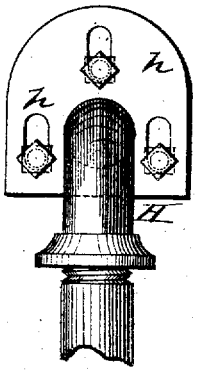

In the accompanying drawing, Figure 1 is a central vertical section of my improved radiator. Figs. 2, 3, and 4 are detailed views of the return-bends.

A represents the chamber or case of the radiator, with doors B B at the front end. C is the inlet-pipe for cold air, and D the exit-pipe for hot air. E is the pipe at the top of the coil, through which the steam enters. E′ is a similar pipe at the bottom of the coil. G G are the pipes forming the steam-coil, and H H are the return-bends.

My invention is a horizontal steam-heater of wrought-iron pipe, to be placed in the cellar or lower part of a building, to act as a heater by radiation, from which the heat is to ascend through flues constructed for the purpose.

The steam will first enter the coil through the pipe E at the top, running crosswise of the coil, to which the first row of pipes G are attached, and the pipe E will be of sufficient diameter to supply all the pipes G with their quota of steam, each row of wrought-iron pipes G to be set at a slight inclination to allow of drainage for the condensation.

The ends of the pipes G are connected by return-bends H H, made in two parts. One end of each part is tapped to suit the pipe, and the other end is fitted with a flanged ground joint, *h*, suitable for lead or rubber, and bolted to a corresponding joint, thus forming the return-bend. The opening in the ground-joint end of the half return-bend is a little oblong in the direction of the pipe to which it is attached, to admit a full flow of steam in case of any variation in length of pipe. The bolt-holes are also made oblong or elongated, and parallel with the opening in the flanged end of half return-bend. The pipe E is made of cast-iron, in sections, so that the heater may be enlarged without disturbing the part already built. This pipe is, on its under side, provided with short necks *a*, at suitable intervals, and each neck fitted with a flanged ground joint, to correspond with the flanged joint of the return-bend, which forms the connection with the first row of pipes G. The pipe E has also a flanged ground joint at each end, to which another section of the heater may be added. The pipe E′ at the bottom is precisely similar, except that the necks are on the upper instead of the under side. The coil is supported by buck-stays J, two on each side at the ends, to which iron rods I are bolted, said rods passing under each horizontal row of pipes.

The chamber A, surrounding the heater, is to be as near air-tight as possible, with the exception of the supply and delivery pipes.

The supply-pipe C, for fresh air, is introduced at the very lowest part of the front of chamber A, and is to extend to the roof of the building being heated. The delivery or hot-air pipe D is in the extreme upper part of the back end of the chamber, and in a line drawn diagonally from the pipe C, both of said pipes being provided with suitable dampers *b*.

The half return-bend H forms an acute angle from the tapped to the ground-joint end, thereby giving the proper inclination to the pipes G.

Having thus fully described my invention, what I claim as new, and desire to secure by Letters Patent, is—

The combination of the chamber A, cold-air pipe C, hot-air pipe D, sectional steam-pipes E E′, inclined pipes G, constructed and arranged with bisected return-bends H H, substantially as and for the purpose herein set forth.

In testimony that I claim the foregoing I have hereunto set my hand this 28th day of April, 1876.

JOHN O. COPE.

Witnesses:
J. M. R. JERMON,
H. L. WHALEY.